United States Patent [19]

Simpson et al.

[11] Patent Number: 4,605,588

[45] Date of Patent: Aug. 12, 1986

[54] BARRIER COATED CERAMIC FIBER AND COATING METHOD

[75] Inventors: Frederick H. Simpson, Seattle; Juris Verzemnieks, Tacoma, both of Wash.

[73] Assignee: The Boeing Company, Seattle, Wash.

[21] Appl. No.: 711,898

[22] Filed: Mar. 14, 1985

[51] Int. Cl.⁴ .......................... D04H 1/58; B32B 9/00

[52] U.S. Cl. ................... 428/288; 427/255; 427/255.4; 428/366; 428/375; 428/388

[58] Field of Search ............... 427/255, 255.4, 255.2, 427/399, 314; 428/366, 375, 698, 288, 388

[56] References Cited

U.S. PATENT DOCUMENTS

| | | | |
|---|---|---|---|
| 2,745,763 | 5/1956 | Ueltz | 106/65 |
| 2,958,610 | 11/1960 | Ramirez | 427/305 |
| 3,058,809 | 10/1962 | Taylor | 423/290 |
| 3,212,926 | 10/1965 | Morelock | 428/698 |
| 3,351,484 | 11/1967 | Gutzeit | 428/408 |
| 3,386,918 | 6/1968 | Hough | 252/63.5 |
| 3,422,321 | 1/1969 | Tombs | 427/255.2 |
| 3,451,840 | 6/1969 | Hough | 427/255.7 |
| 3,520,722 | 7/1970 | Scott | 427/255.2 |
| 3,573,969 | 4/1971 | Camahort et al. | 427/399 |
| 3,576,610 | 4/1971 | Mathewson | 51/295 |
| 3,634,132 | 1/1972 | Camahort et al. | 428/366 |
| 3,668,059 | 6/1972 | Economy et al. | 501/96 |
| 3,720,536 | 3/1973 | Scola et al. | 427/444 |
| 3,811,928 | 5/1974 | Henney et al. | 427/255.4 |
| 3,837,997 | 9/1974 | Economy et al. | 428/366 |
| 3,955,038 | 5/1976 | Lindstrom et al. | 427/419.4 |
| 4,009,305 | 2/1977 | Fujimaki et al. | 427/399 |
| 4,163,074 | 7/1979 | Ebata et al. | 427/419.2 |
| 4,196,233 | 4/1980 | Bitzer | 427/255 |
| 4,284,610 | 8/1981 | Hamilton | 501/95 |
| 4,309,203 | 1/1982 | Tworek et al. | 428/366 |
| 4,331,772 | 5/1982 | Torre | 501/97 |
| 4,335,190 | 6/1982 | Bill et al. | 427/419.2 |
| 4,346,147 | 8/1982 | Barlier et al. | 427/314 |

*Primary Examiner*—Sadie L. Childs
*Attorney, Agent, or Firm*—John C. Hammar

[57] ABSTRACT

Oxide-based ceramic fibers are treated in a novel process to create a substantially uniform boron nitride barrier coating at their surface. The process includes the step of heating the fiber, preferably an aluminoborosilicate fiber like NEXTEL, for between about 5–90 minutes in a nitriding atmosphere of ammonia, hydrogen and nitrogen at a temperature of between about 2200°–2600° F. to diffuse boron from the fiber to the surface of the fiber where it reacts to form the boron nitride coating.

24 Claims, No Drawings

BARRIER COATED CERAMIC FIBER AND COATING METHOD

TECHNICAL FIELD

The present invention relates to ceramic fibers, and more particularly, to an aluminoborosilicate glass fiber having a uniform boron nitride coating.

BACKGROUND ART

Fibrous composites are promising for making ceramics considerably tougher by imparting resistance to crack propagation to the ceramic. Carbon and silicon carbide fiber reinforcement strengthens the brittle matrices of glasses and glass ceramics. A problem exists with oxide-based fibers, however, because they degrade or react with the matrix when the ceramics or glasses are molded. The reaction between the fiber and the matrix results in a high degree of bonding which renders the toughening mechanisms inoperable. This problem for oxide-based fibers can be solved by creating a barrier coating on the fibers. Preferably, a suitable barrier coating would be relatively inert, and would comprise a physical separation between the ceramic or glass matrix and the reinforcing fiber. The barrier would eliminate any reactions between the oxide fiber and the ceramic matrix or would substantially slow the kinetics of such reaction so that toughening would result in the composite.

While there are many methods for creating a boron nitride coating on fibers, none is completely suitable. For example, a boron nitride coating can be formed by exposing the fibers to boron oxide or boric acid. Boron oxide, an intermediate in the process, is extremely damaging to oxide-based ceramic fibers, so the process cannot be used to barrier coat them. Chemical vapor deposition (CVD) has been used to provide boron nitride coatings. Chemical vapor deposition is unsatisfactory because it requires the careful and precise injection of predetermined amounts of reactive gases containing boron and nitrogen and precise control of the temperature. Only then can the gases react at or near the surface of the fiber and deposit a coating on the surface. Control of the deposition thickness and of the quality of the barrier coating is difficult. The most serious difficulty with the CVD process, however, is ensuring that the coating is uniform about the entire surface of the fiber. In the CVD process, the gaseous components react on the first hot surface on which they come into contact. Thus, CVD coating is usually limited to monofilament applications where the entire fiber surface is readily accessible. Fiber cloths or yarns are not as amenable to creation of uniform coatings through the CVD process.

SUMMARY OF THE INVENTION

Oxide-based ceramic fibers are uniformly coated with boron nitride by heating the fibers in a nitriding atmosphere so that boron, usually in the form of boria within the fiber, diffuses to the surface of the fiber and reacts at the surface or slightly within the fiber to form boron nitride or other boron/oxygen/nitrogen compounds which create the barrier coating. Because one component of the barrier coating is found only within the fiber itself, the reaction between the boron and nitrogen can only take place in the region of the fiber surface. The process results in the creation of a substantially uniform, thin coating at the surface of the oxide-based ceramic fiber.

BEST MODE CONTEMPLATED FOR THE INVENTION

The process of the present invention is particularly advantageous for creating a boron nitride barrier coating on aluminoborosilicate fibers, such as NEXTEL 312 glass cloth fibers, available from 3M Corp. This fiber has about 12% boria by wt. Fibers with similar boria content or higher concentrations are preferred. The coating is created by heating the fibers in a nitriding atmosphere containing a mixture of ammonia, nitrogen, and hydrogen at a temperature in excess of 2000° F., and generally within the range between about 2200° and 2500° F. Temperatures above 2600° F. should be avoided since the NEXTEL 312 fibers severely degrade at or above this temperature. Temperatures below 2000° F. require excessive exposure times within the furnace. At 2500° F., exposure to a nitriding atmosphere for 5-15 minutes achieves the desired boron nitride coating. At 2400° F., exposure of 15-30 minutes is required to achieve the same coating. At 2200° F., the exposure time increases to at least 90 minutes. Thus, the rate of reaction is dramatically temperature dependent and temperatures in the range of 2400°-2500° F. are highly preferred.

The elevated temperature within the furnace causes boron or boron oxide (boria) within the aluminoborosilicate fiber to diffuse from the fiber to the surface and to volatilize there. If the proper nitriding atmosphere is present during heat treatment, when this boron volatilizes, it will react at or near the surface of the fiber to form an extremely uniform, thin, and continuous coating on all the fiber surfaces including fractures and fiber ends. Because the process is diffusion dependent, it is important that the fibers contain an adequate amount of boria to promote the reaction. NEXTEL 312 fibers are preferred.

The method creates coated, oxide-based ceramic fibers for reinforcing in ceramics and glasses to increase their toughness. The coated fibers can be used in environments which are detrimental to the uncoated fiber, such as moist or acidic environments. Aluminoborosilicate fibers are especially adapted for use in radome or other radar applications, where silicon carbide or carbon fibers are ineffective. The NEXTEL 312 fibers have excellent radar transmission characteristics as does boron nitride. With the barrier coated fibers, ceramic composite radomes which are light, strong, and tough may be made without significant loss of transmission characteristics. Carbon and silicon carbide fibers cannot be used in radar applications because they absorb or reflect a substantial portion of the electromagnetic energy.

Examination of coated fibers of this invention using electron spectroscopy confirms the presence of boron nitride at the fiber surface. Complete and substantially uniform coverage of the surface results.

Preferably, the nitriding atmosphere contains an effective amount of ammonia, usually between about 5-100 vol. % of the atmosphere. Energy efficiency in the furnace is gained by diluting the ammonia with inert gases, such as nitrogen and hydrogen. Generally, between 0-12 vol. % hydrogen (and more preferably between 4-12%) is used to dilute the ammonia, while the remainder of the nitriding atmosphere is nitrogen. Typically, the ammonia comprises between about 5-10 vol. % of the nitriding atmosphere. The most preferred gas mixture based upon the present experimental data includes about 5 vol. % ammonia, 11 vol. % hydrogen, and the remainder nitrogen.

It is difficult to obtain uniform coatings at temperatures below about 2200° F. even with long exposure. Therefore, the effective lower temperature limit is normally set at 2200° F.

The experimental treatment process included placing the fiber in a nitriding atmosphere, slowly heating the fiber over a 2 hour heating cycle to about 2400° F., and, thereafter, maintaining the temperature for 15-30 minutes to finish the nitriding reaction. Much faster heating cycles are foreseen and contemplated for commercial operations where the fibers may be drawn in a continuous process through the reaction zone. The experimental heating rate was selected in part by concern for furnace life. In practice, faster heating rates would be desired for optimal fiber strength retention.

A continuously flowing gas with flowrates between approximately 0.25 to 3.20 standard liters per minute was used in the experiments, but faster or slower flows will probably be just as useful. We do not believe that the flowrate is critical since the gas is in large excess to the boria. Static furnace environments should also work.

The effectiveness of the operation may be dependent upon the level of oxygen within the nitriding atmosphere, although the effect of oxygen is not well understood. Reproduceable results, however, have been obtained in an inert gas furnace having a zirconia liner and molybdenum resistance heating elements. Such a furnace liner is produced by Zircar Products, Inc. of Florida, N.Y.

Coating may be achievable with even lower concentrations of ammonia in the nitriding atmosphere, but reaction times would probably increase. Ammonia or another suitable reactive source of nitrogen must be added to $N_2$ on to another inert gas to form the nitriding atmosphere because gaseous nitrogen alone will not react to form the boron nitride coating at the temperatures that must used. That is, at the temperatures usable in treating these fibers, $N_2$ alone will not react with the boria to any significant degree.

Although the description has focused upon aluminoborosilicate fibers, it is believed that the process is applicable to any boron-containing fiber, and particularly those containing boria. NEXTEL 312 fibers are preferred.

While preferred embodiments of the invention have been described, those skilled in the art will readily recognize modifications which might be made to the invention without departing from its inventive concept. Therefore, the claims should be construed liberally in light of this description to adequately cover the invention, and should not be limited except as is necessary in light of pertainent prior art.

We claim:

1. A method for coating a ceramic fiber that contains boron with boron nitride comprising the step of heating the fiber in the presence of a nitriding atmosphere to diffuse boron in the fiber to the fiber surface without forming liquid boron oxide or boric acid that can degrade the fiber and to react the boron at the surface with a suitable source of nitrogen in the atmosphere, the reaction occuring at a temperature of at least about 2200° F.

2. The method of claim 1 wherein the atmosphere includes an effective amount of $NH_3$.

3. The method of claim 2 wherein the atmosphere includes a mixture of $NH_3$, $N_2$, and $H_2$.

4. The method of claim 2 wherein the atmosphere includes about 5-100 vol.% $NH_3$, 0-12 vol.% $H_2$, and the remainder $N_2$.

5. The method of claim 2 wherein the atmosphere includes about 5-10 vol.% $NH_3$, 4-12 vol% $H_2$, and the remainder $N_2$.

6. The method of claim 1 wherein the fiber includes aluminoborosilicate.

7. The method of claim 1 wherein the atmosphere is a flowing gas.

8. The method of claim 1 wherein the fiber contains about 12% boria by wt.

9. A method for forming a substantially uniform barrier coating about an oxide-based ceramic fiber in a fiber cloth, the fiber containing boron, comprising the steps of:
   (a) heating the fiber in the presence of a nitriding atmosphere at a temperature of between about 2200°-2600° F. to diffuse boron in the fiber to the surface of the fiber without forming liquid boron oxide or boric acid that can degrade the fiber; and
   (b) maintaining the temperature in the range for between about 5-90 minutes to react the boron at or near the surface with a reactive nitrogen source in the atmosphere to form a substantially uniform boron nitride coating on the surface of the fiber.

10. The method of claim 9 further comprising the step of circulating the nitriding atmosphere past the fiber.

11. The method of claim 9 wherein the nitriding atmosphere includes a mixture of ammonia, nitrogen, and hydrogen.

12. The method of claim 11 wherein the nitriding atmosphere includes about 5-10 vol.% $NH_3$.

13. A method for forming a substantially uniform barrier coating about aluminoborosilicate ceramic fibers in a fiber cloth wherein the fiber contains boria, comprising the steps of:
   (a) heating the fibers to a temperature of about 2200°-2600° F. in the presence of a nitriding atmosphere that contains an effective amount of $NH_3$, the heating causing boron in the fibers to diffuse to the fiber surface without forming liquid boron oxide or boric acid that can degrade the fiber; and
   (b) maintaining the temperature in the range for between about 5-90 minutes to allow formation of a substantially uniform barrier coating of boron nitride at each fiber surface in the cloth.

14. The method of claim 13 wherein the atmosphere includes a mixture of about 5 vol % $NH_3$, about 11 vol % $H_2$, and about 84 vol % $N_2$, and wherein the temperature is maintained at about 2400° F. for about 15-30 min to react to the boron with the ammonia.

15. A barrier coated ceramic fiber made according to the method of claim 1.

16. A barrier coated ceramic fiber made according to the method of claim 5.

17. A barrier coated ceramic fiber made according to the method of claim 9.

18. A barrier coated ceramic fiber cloth made according to the method of claim 13.

19. The method of claim 1 wherein the temperature is maintained at about 2400°-2500° F.

20. The method of claim 9 wherein the temperature is between about 2400°–2500° F. and the reaction occurs for between about 5–30 minutes.

21. The method of claim 13 wherein the temperature is between about 2400°–2500° F. and the reaction occurs for between about 5–30 minutes.

22. The method of claim 1 wherein the fiber is NEXTEL 312.

23. The product of the process of claim 22.

24. A method for coating a ceramic fiber that contains boron with a substantially uniform boron nitride comprising the step of exposing the uncoated fiber to a heated atmosphere containing ammonia at a temperature of about 2200°–2600° F. for about 5–90 minutes to cause boron in the fiber to diffuse to the surface and to react at or near the surface to form boron nitride without forming liquid boron oxide or boric acid.

* * * * *